(12) United States Patent
Bent et al.

(10) Patent No.: US 9,110,820 B1
(45) Date of Patent: Aug. 18, 2015

(54) HYBRID DATA STORAGE SYSTEM IN AN HPC EXASCALE ENVIRONMENT

(71) Applicant: EMC Corporation, Hopkinton, MA (US)

(72) Inventors: John M. Bent, Los Alamos, NM (US); Sorin Faibish, Newton, MA (US); Uday K. Gupta, Westford, MA (US); Percy Tzelnic, Concord, MA (US); Dennis P. J. Ting, Groton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/230,804

(22) Filed: Mar. 31, 2014

(51) Int. Cl.
*G06F 13/38* (2006.01)
*G06F 13/10* (2006.01)
*G06F 3/00* (2006.01)

(52) U.S. Cl.
CPC .................................... *G06F 13/10* (2013.01)

(58) Field of Classification Search
None
See application file for complete search history.

(56) References Cited

U.S. PATENT DOCUMENTS

2012/0155256 A1\* 6/2012 Pope et al. .................... 370/230

\* cited by examiner

*Primary Examiner* — Scott Sun
(74) *Attorney, Agent, or Firm* — Krishnendu Gupta; Konrad R. Lee

(57) ABSTRACT

A computer-executable method, system, and computer program product for managing I/O requests from a compute node in communication with a data storage system, including a first burst buffer node and a second burst buffer node, the computer-executable method, system, and computer program product comprising striping data on the first burst buffer node and the second burst buffer node, wherein a first portion of the data is communicated to the first burst buffer node and a second portion of the data is communicated to the second burst buffer node, processing the first portion of the data at the first burst buffer node, and processing the second portion of the data at the second burst buffer node.

15 Claims, 16 Drawing Sheets

HYBRID DATA STORAGE SYSTEM IN AN HPC EXASCALE ENVIRONMENT

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing I/O requests from a compute node in communication with a data storage system, including a first burst buffer node and a second burst buffer node, the computer-executable method, system, and computer program product comprising striping data on the first burst buffer node and the second burst buffer node, wherein a first portion of the data is communicated to the first burst buffer node and a second portion of the data is communicated to the second burst buffer node, processing the first portion of the data at the first burst buffer node, and processing the second portion of the data at the second burst buffer node.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
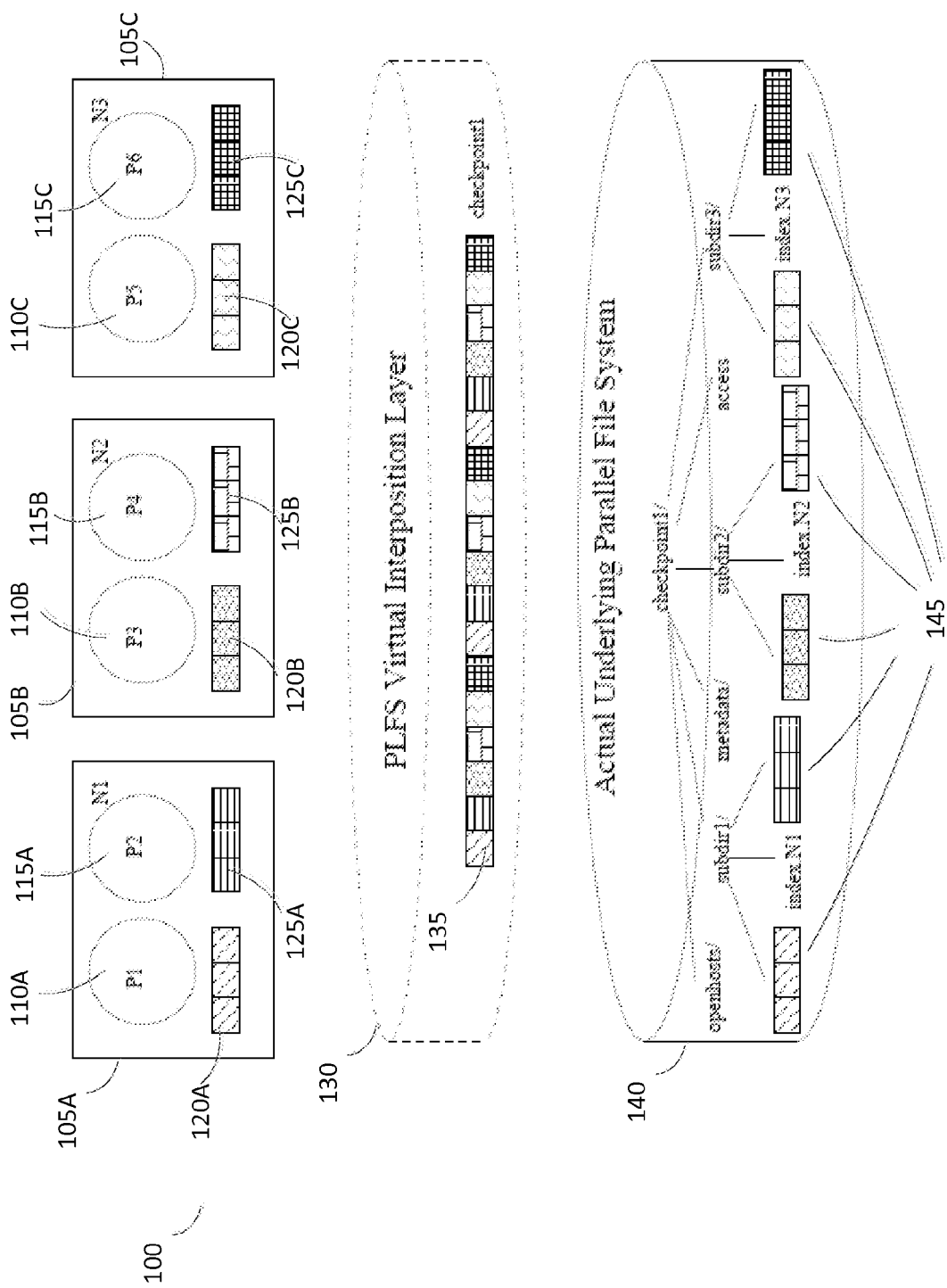
FIG. 1 is a simplified illustration of PLFS, in accordance with an embodiment of the present disclosure.

Typically, as High Performance Computing (HPC) continues its inexorable march towards exascale, it has become economically infeasible to build HPC storage with disk-only storage. Traditionally, in High Performance Computing (HPC) environments, data storage systems have been dealing with the increasing amount of data being processed. Typically, along with increased amounts of data, HPC environments manage an ever increasing amount of metadata to efficiently manage the increased amount of data being stored and processed on data storage system. Generally, metadata is collected into a single location and is unwieldy to manage, search through, and read/write from when dealing with a large amount of metadata. Conventionally, being able to improve performance of metadata storage in HPC environments may be beneficial to the performance of a data storage system.

Traditionally, a Parallel Logged File System (PLFS) works by running on a compute node and storing each write into a set of burst buffers. Conventionally, each compute node writes to one local burst buffer. Typically, for reading, any compute node may need to fetch data from any of the burst buffers. Generally, a PLFS implementation creates problems since every reader on every computer node must know about all of the PLFS metadata in order to find data which may be on any of the burst buffers.

In many embodiments, the current disclosure may enable addition of a flash tier of data storage to HPC environments. In various embodiments, the current disclosure may enable implementation of a burst buffer appliance which may use a Parallel Logged File System (PLFS) to manage incoming data storage needs. In certain embodiments, implementation of PLFS may improve storage bandwidth by removing unnecessary file system locks and other serializing bottlenecks, however, PLFS may also create overwhelming copious amounts of metadata. In many embodiments, combining PLFS with sharding data across a large number of nodes may take advantage of the benefits of PLFS while minimizing the resources needed to manage the copious amounts of metadata.

In many embodiments, the current disclosure may enable an implementation of PLFS off a compute node and onto a burst buffer appliance. In various embodiments, compute nodes may use an I/O forwarding layer, such as, but not all inclusive, IOFSL, DVS, and/or 9P. In certain embodiments, an I/O forwarding layer may be enabled to implement a simple round-robin striping of data for both writes and reads across the burst buffers where PLFS may continue to execute the log-structuring to maximize performance in a HPC Environment.

In some embodiments, implementation of simple striping parameters on compute nodes may enable each compute node to no longer require consultation with global PLFS metadata to locate any particular data. In many embodiments, each compute node may consult a smaller local index to determine which burst buffer to target. In various embodiments, each compute node may be enabled to directly go to an appropriate target burst buffer with PLFS implemented and utilize the PLFS metadata on the target burst buffer. In certain embodiments, the current disclosure may enable compute nodes to process smaller amounts of PLFS metadata rather than attempting to process PLFS metadata for all data stored in the HPC environment. In certain embodiments, the current disclosure may not reduce the total amount of metadata, rather the current disclosure may enable the metadata to be shared such that no one reader nor any one PLFS instance need consult the global metadata.

In many embodiments, the current disclosure may enable the stripe size to be well-aligned with the parallel file system running on the disk tier such that the file may be "flattened" when migrated to further reduce the PLFS metadata. In various embodiments, the starting burst buffer node for the round robin striping for each file stored in the HPC Environment may be determined by hashing the filename or using the i-node identifier. In certain embodiments, the starting burst buffer may be used as the initial burst buffer in the striping layout for each file. In most embodiment, an i-node may be how a file system looks up metadata for a while. In various embodiments, well-aligned may mean that data that a user may be writing fits within block-sizes of a file system. In certain embodiments, a file system may have many block-sizes in storage.

In many embodiments, well-aligned striped parallel mode writing to a shared file may benefit from PLFS. In various embodiments, for large jobs, performance gain due to PLFS may be up to 60% improved write bandwidth. In certain embodiments, for poorly aligned I/O, the performance gain may be much greater. In other embodiments, with multiple metadata sub-files on the burst buffers, PLFS may enable parallel range writes to multiple metadata sub-files, thereby avoiding serialized I/O to a single burst buffer metadata file. In some embodiments, PLFS may be enabled to help performance when draining large shared files to a global file system. In other embodiments, efficient parallelization may be created by configuring stripe size on a per-file basis by a user.

In many embodiments, PLFS may be implemented in a "small-file" mode where PLFS may speed up the creation rate of multiple small files. In various embodiments, I/O forwarding combined with PLFS may be enabled to transform a large number of creates in the I/O Forwarding/PLFS namespace to a smaller number of creates in the burst buffer file system. In certain embodiments, with a burst buffer approach and I/O Forwarding routing, the increase in PLFS index metadata for small-file I/O may become more manageable. In other embodiments, subsequent migration to a global file system may "unwrap" the file compression thereby removing all of the PLFS index metadata.

In various embodiments, a flat-file mode of PLFS may easily allow a I/O forwarder to export multiple filesystems as a single namespace in instances in which greater metadata distribution may be desired and multiple metadata servers may be available. In certain embodiments, if a system has multiple parallel file systems, then PLFS may be enabled to distribute metadata across all of the metadata servers and may be enabled to aggregate all of the available bandwidth across the multiple parallel file systems.

In many embodiments, PLFS metadata may be an efficient mechanism to track when and where ranges of data have been written. In various embodiments, PLFS metadata may enable efficient reading and rewriting of existing files that have been previously migrated from the burst buffers to the parallel file system.

An exemplary architecture for PLFS is discussed further below in conjunction with FIGS. 1 and 2. For a more detailed discussion of PLFS, see, for example, John Bent et al., "PLFS: A Checkpoint Filesystem for Parallel Applications," LANL Technical Information Release: 09-02117 (2009) incorporated by reference herein.

Refer now to the example embodiment of FIG. 1. FIG. 1 is a simplified illustration of PLFS, in accordance with an embodiment of the present disclosure. As shown, PLFS 100 reorganizes an N−1 strided checkpoint file 135 onto the underlying parallel file system 140. Compute nodes 105A, 105B, 105C include processes 110A, 115A, 1105B, 115B, 110C, 115C and data buffers 120A, 125A, 120B, 125B, 120C, 125C containing process states of processes 110A, 115A, 1105B, 115B, 110C, 115C. Data buffer 120A is associated with process 110A and data buffer 125A is associated with process 115A. Data buffer 120B is associated with process 110B and data buffer 125B is associated with process 115B. Data buffer 120C is associated with process 110C and data buffer 125C is associated with process 115C. Processes 110A, 115A, 110B, 115B, 110C, 115C create checkpoint file 135 on PLFS 130 causing PLFS 130 to create container structure 145 on underlying parallel file system 140. Container structure 145 includes a top-level directory and several sub-directories to store application data. In many embodiments, for each write, PLFS may append incoming data to the corresponding data file and may append a record onto the appropriate index file. In various embodiments, each record may contain the length of the write, its logical offset, and a pointer to its physical offset within the data file to which it was appended. In other embodiments, to resolve reads, PLFS may aggregate each index file to create a lookup table for the logical file.

Figure 2:
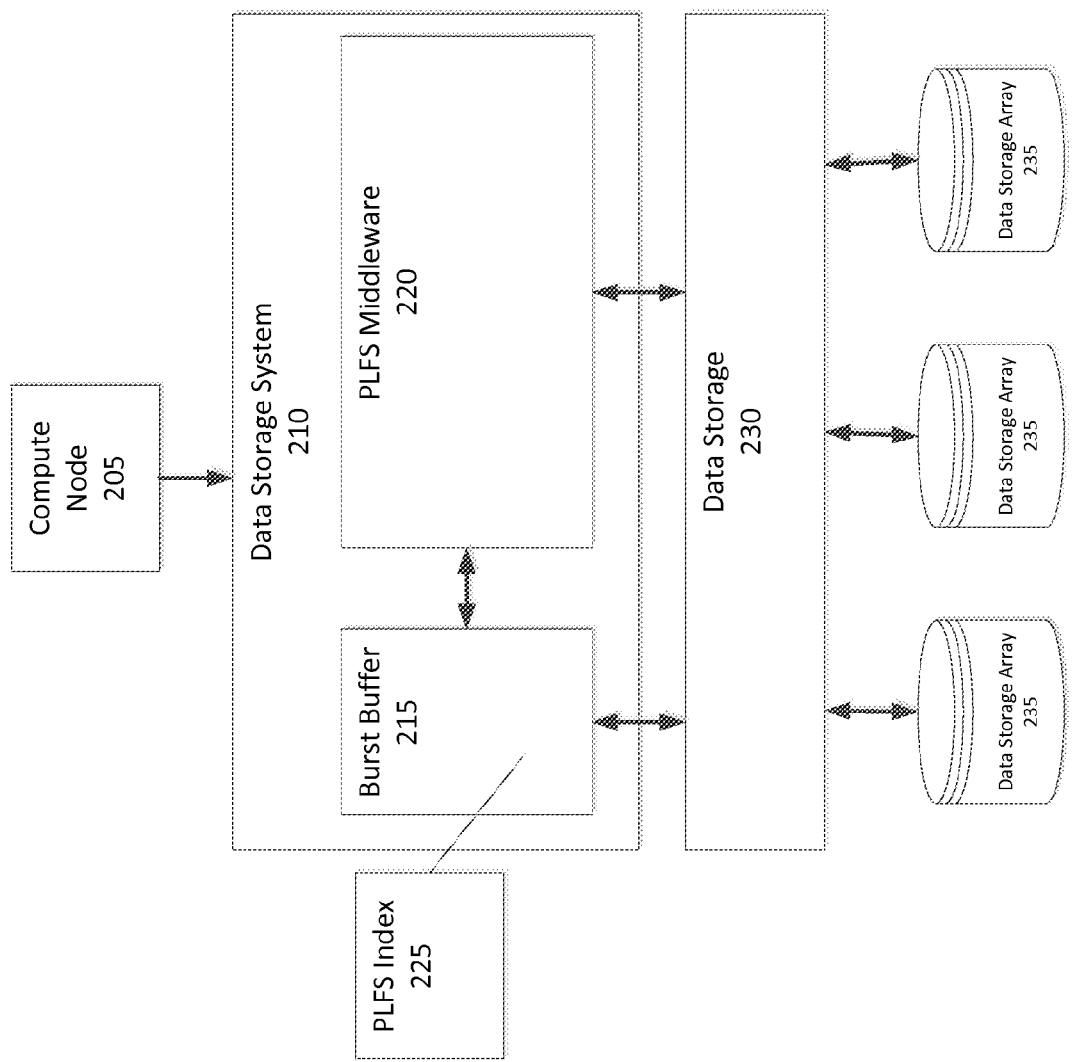
FIG. 2 is a simplified illustration of an implementation of PLFS, in accordance with an embodiment of the present disclosure.

Refer now to the example embodiment of FIG. 2. FIG. 2 is a simplified illustration of an implementation of PLFS, in accordance with an embodiment of the present disclosure. As shown, data storage system 210 includes PLFS middleware 220, Burst Buffer 215, and is in communication with data storage 230. Data storage 230 includes one or more data storage arrays 235. In this embodiment, PLFS Middleware 220 creates a PLFS index 225 which is enabled to be accessed from burst buffer 215. PLFS index 225 contains information related to the mapping of data and/or data I/Os sent to data storage system 210 by compute node 205 and how PLFS middleware 220 stores the data and/or data I/Os on data storage 230. In many embodiments, a PLFS index may contain logical offsets and lengths of each write to a data storage system. In this embodiment, PLFS index 225 contains single entries that map to data and/or data I/Os stored on data storage 230.

Figure 3:
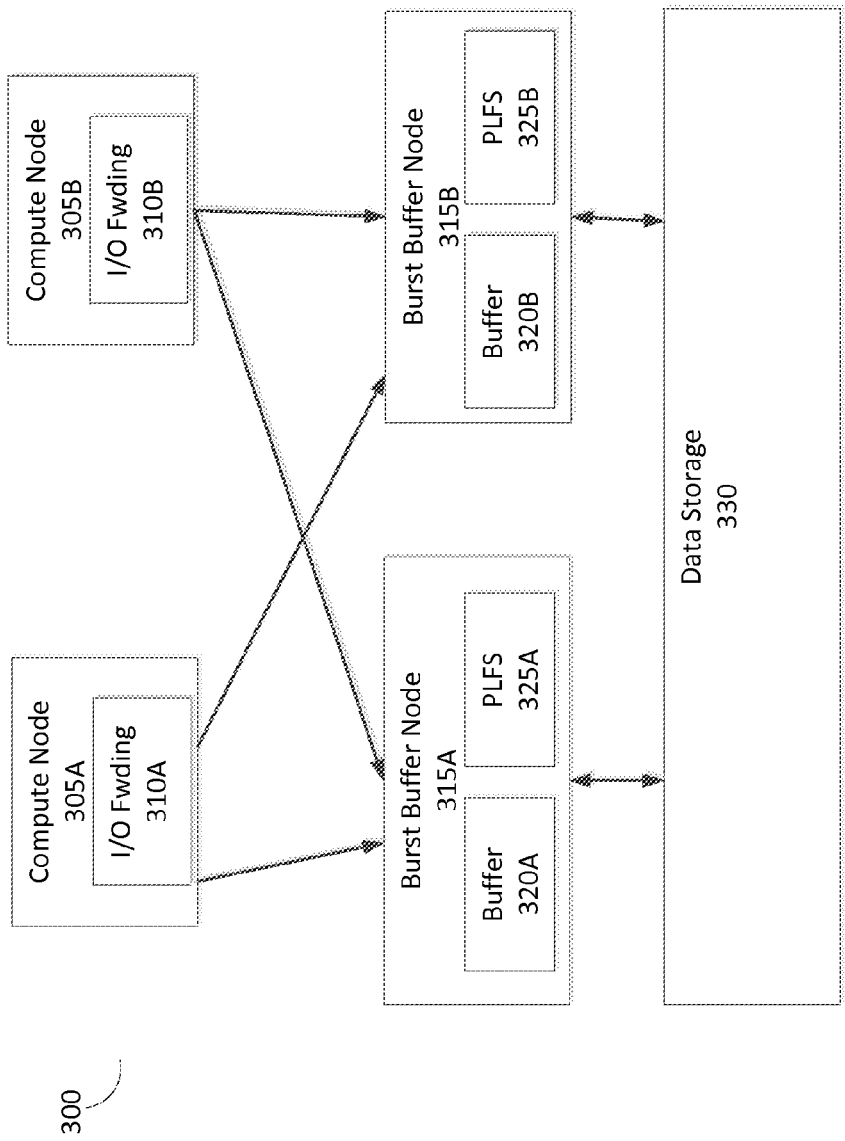
FIG. 3 is a simplified illustration of an implementation of a HPC Environment combining PLFS with I/O Forwarding, in accordance with an embodiment of the present disclosure.

Refer to the example embodiment of FIG. 3. FIG. 3 is a simplified illustrates of an implementation of a HPC Environment combining PLFS with I/O Forwarding, in accordance with an embodiment of the present disclosure. As shown, HPC Environment 300 includes compute node 305A, compute node 305B, Burst buffer node 315A, Burst Buffer Node 315B, and data storage arrays 330. Compute Node 305A is in communication with Burst buffer node 315A and burst buffer node 315B. Compute node 305B is in communication with Burst buffer node 315A and burst buffer node 315B. Burst buffer node 315A is in communication with data storage array 330. Burst buffer node 315B is in communication with data storage 330. Burst buffer node 315A includes flash data buffer 320A and includes an implementation of PLFS 325A. Burst buffer node 315B includes flash data buffer 320B and includes an implementation of PLFS 325B.

In this embodiment, compute node 305A and compute node 305B are enabled to store data using burst buffer node 315A and burst buffer node 315B. Compute node 305A is enabled to use I/O forwarding 310A to stripe data on burst buffer nodes 315A, 315B. Compute node 305B is enabled to use I/O forwarding 310B to stripe data on burst buffer nodes 315A, 315B.

Figure 4:
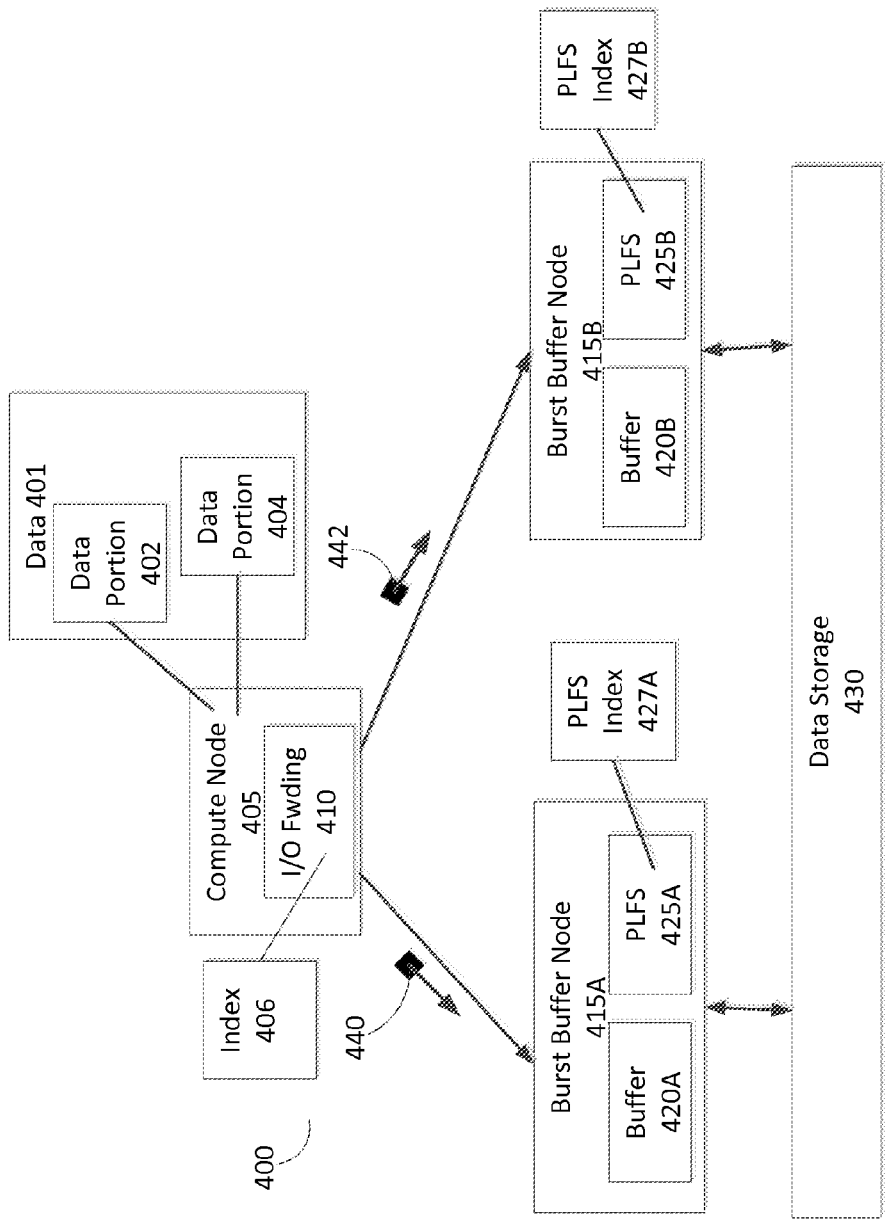
FIG. 4 is a simplified illustration of an implementation of PLFS combined with an I/O forwarder in a HPC Environment in a first state, in accordance with an embodiment of the present disclosure.

Refer to the example embodiment of FIG. 4. FIG. 4 is a simplified illustration of an implementation of PLFS combined with an I/O forwarder in a HPC Environment in a first state, in accordance with an embodiment of the present disclosure. As shown, HPC Environment 400 includes compute node 405, burst buffer node 415A, burst buffer node 415B, and data storage arrays 430. Compute node 405 is in communication with Burst buffer nodes 415A, 415B. Burst buffer node 415A is in communication with data storage 430. Burst buffer node 415B is in communication with data storage 430. Compute node 405 includes I/O forwarding module 410, burst buffer node 415A includes flash storage buffer 420A and PLFS implementation 425A. Burst buffer node 415B includes flash storage buffer 420B and PLFS implementation 425B.

In this embodiment, compute node 405 is storing data 401 within HPC environment 400. Compute node 405 utilizes I/O Forwarding module 410 to store data 401. I/O forwarding 410 hashes the file name of data 401 and splits data 401 into data portions 402, 404. The hash of the filename of data 401 determines upon which burst buffer node striping of data portions 402, 404 begins. In this embodiment, striping of data portions 402, 404 starts at burst buffer node 415A. I/O forwarding 410 stores the hash and/or starting point of the striping within index 406. I/O forwarding 410 sends data portion 402 to burst buffer node 415A using message 440. I/O forwarding 410 sends data portion 402 to burst buffer node 415B using message 442. PLFS implementation 425A receives message 440, processes data portion 402, and updates PLFS index 427A with metadata associated with data portion 402. PLFS implementation 425B receives message 442, processes data portion 404, and updates PLFS index 427B with metadata associated with data portion 404. In this embodiments, meta data associated with data portion 402 and data portion 404 are divided between burst buffer node 415A and burst buffer node 415B. A compute node looking for data portion 402 or data portion 404 needs to look through only a portion of the metadata associated with Data 401 and/or any other data stored within HPC Environment 400. In many embodiments, metadata created at an I/O forwarding module may be synchronized at one more other compute nodes in a HPC environment.

Figure 5:
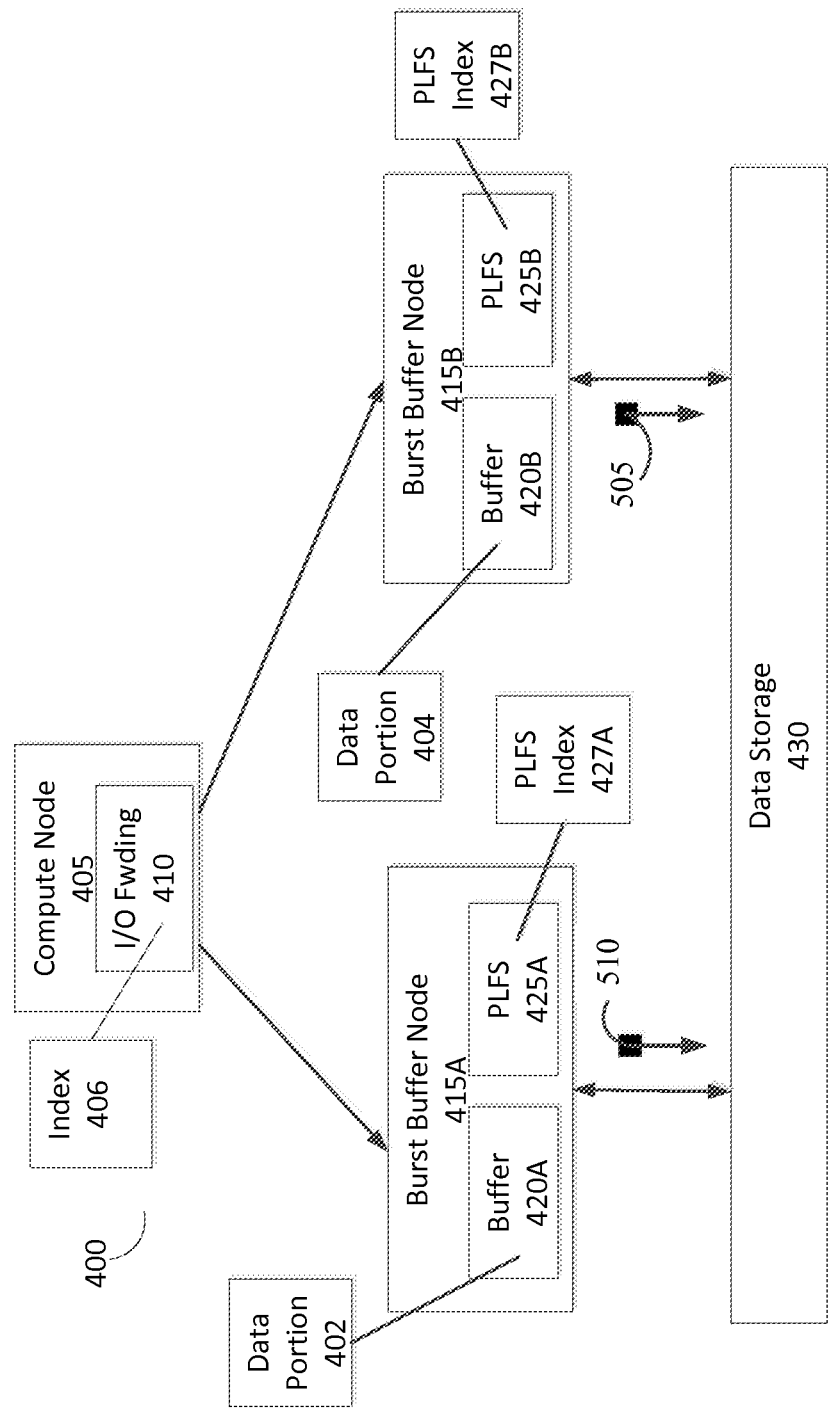
FIG. 5 is a simplified illustration of an implementation of PLFS combined with an I/O forwarder in a HPC Environment in a second state, in accordance with an embodiment of the present disclosure.

Refer to the example embodiment of FIG. 5. FIG. 5 is a simplified illustration of an implementation of PLFS combined with an I/O forwarder in a HPC Environment in a second state, in accordance with an embodiment of the present disclosure. As shown, data portion 402 is stored on flash storage buffer 420A and data portion 404 is stored on flash storage buffer 420B. In this embodiment, PLFS implementation 425A decides to replicate data portion 402 on data storage array 430 using message 510. PLFS implementation 425B decides to replicate data portion 404 on data storage array 430 using message 505. In many embodiments, a PLFS implementation may determine that a data portion is cold and migrate the data portion to a data storage array. In various embodiments, a PLFS implementation may determine that a data portion is cold and allow the data portion to be removed from a flash storage buffer if the data portion is stored on a data storage array in communication with the PLFS implementation.

Figure 6:
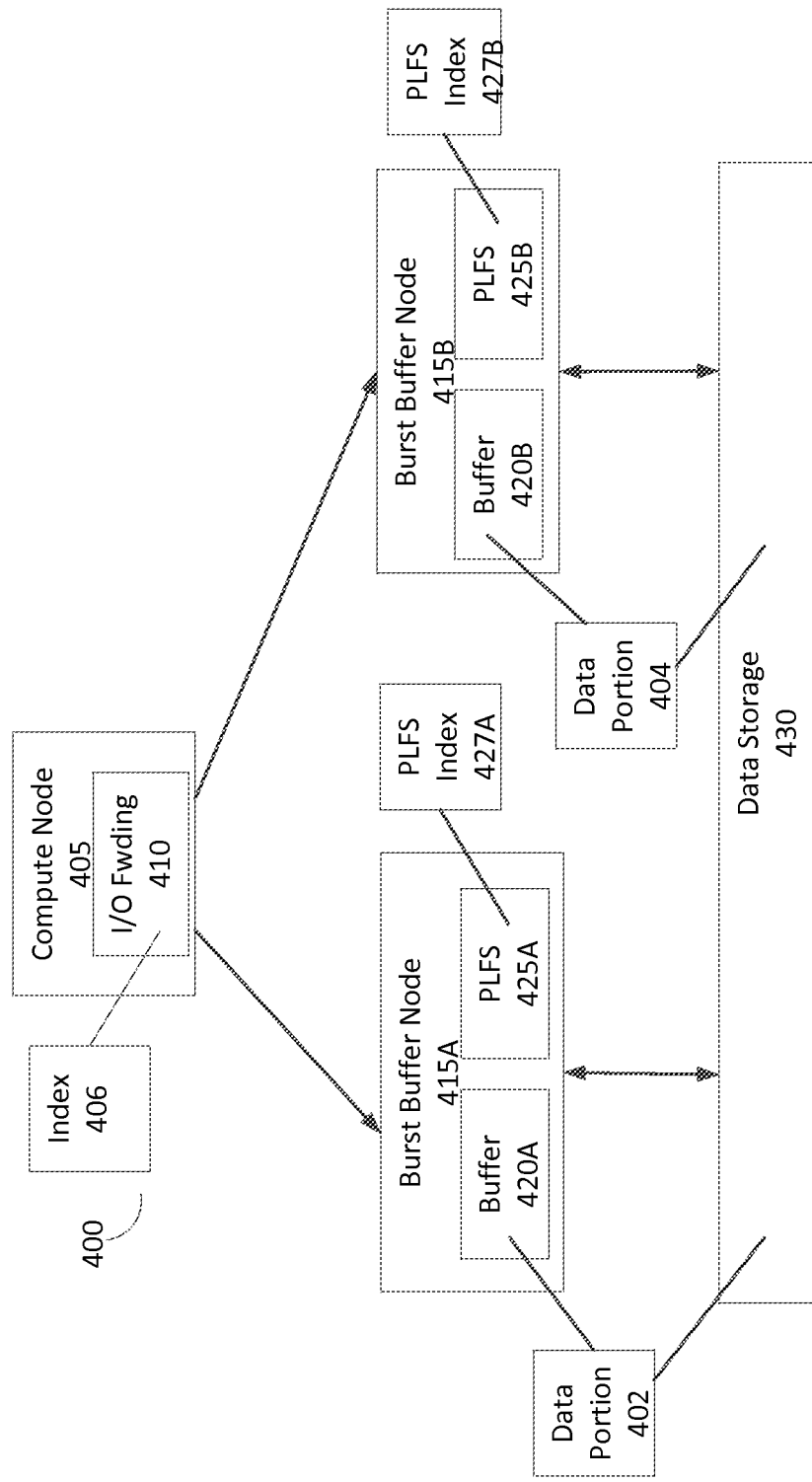
FIG. 6 is a simplified illustration of an implementation of PLFS combined with an I/O forwarder in a HPC Environment in a third state, in accordance with an embodiment of the present disclosure.

Refer to the example embodiment of FIG. 6. FIG. 6 is a simplified illustration of an implementation of PLFS combined with an I/O forwarder in a HPC Environment in a third state, in accordance with an embodiment of the present disclosure. As shown, data portion 402 is stored on flash storage buffer 420A and data storage 430. Data portion 404 is stored on flash storage buffer 420B and data storage array 430.

Figure 7:
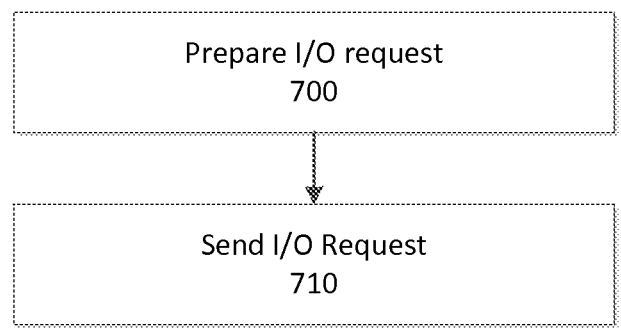
FIG. 7 is a simplified flowchart of a method of storing data and associated metadata in the HPC Environment shown in FIG. 4, in accordance with an embodiment of the present disclosure.

Refer to the example embodiments of FIGS. 4 and 7. FIG. 7 is a simplified flowchart of a method of storing data and associated metadata in the HPC Environment shown in FIG. 4, in accordance with an embodiment of the present disclosure. In this embodiment, compute node includes data 401 and uses I/O forwarding 410 to store data 401 within HPC environment 400. I/O Forwarding 410 prepares I/O request (Step 700). I/O Forwarding 410 hashes the file name of data 401 and determine on which burst buffer to being striping data 401. I/O forwarding 410 splits data 401 into data portion 402 and data portion 404. I/O forwarding 410 sends I/O request to burst buffer node 415A and burst buffer node 415B (Step 710) using message 440 and message 442. As shown, message 440 contains data portion 402 and message 442 contains data portion 404.

Figure 8:
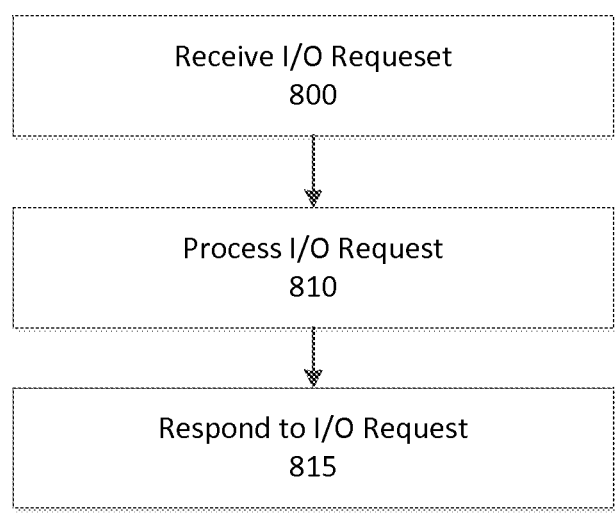
FIG. 8 is a simplified flowchart of a method of storing data and associated metadata in the HPC Environment shown in FIG. 4, in accordance with an embodiment of the present disclosure.

Refer to the example embodiments of FIGS. 4 and 8. FIG. 8 is a simplified flowchart of a method of storing data and associated metadata in the HPC Environment shown in FIG. 4, in accordance with an embodiment of the present disclosure. As shown, Burst buffer 415A receives message 440 containing data portion 402 (Step 800). PLFS implementation 425A processes I/O request (Step 810) by storing data portion 402 on flash storage buffer 420, creating metadata associated with data portion 402, and storing the metadata in PLFS index 427A. Upon completion of processing, PLFS implementation responds to the received I/O request (Step 820) by signaling completion.

Figure 9:
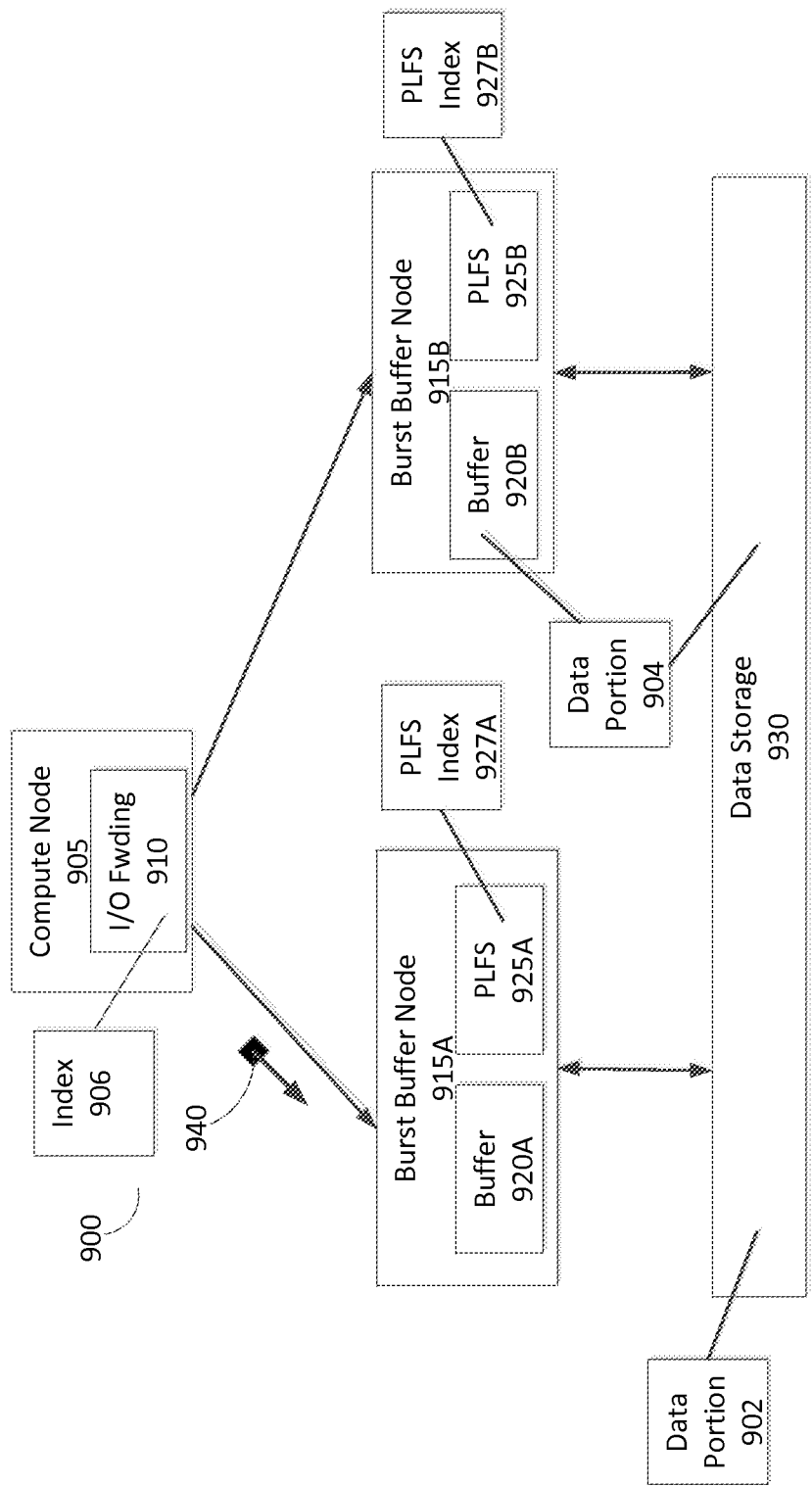
FIG. 9 is a simplified illustration of an implementation of PLFS combined with an I/O forwarder requesting data in a HPC Environment in a first state, in accordance with an embodiment of the present disclosure.

Refer to the example embodiment of FIG. 9. FIG. 9 is a simplified illustration of an implementation of PLFS combined with an I/O forwarder requesting data in a HPC Environment in a first state, in accordance with an embodiment of the present disclosure. As shown, HPC environment 900 includes compute node 905, burst buffer nodes 915A, 915B, and data storage arrays 930. Compute node 905 is in communication with burst buffer 915A and burst buffer node 915B. Burst Buffer node 915A is in communication with data storage 930 and burst buffer node 915B is in communication with data storage array 930. Compute node 905 includes an I/O forwarding module 910. Burst buffer node 915A includes flash storage buffer 920A and PLFS Implementation 925A. Burst buffer node 915B includes flash storage buffer 920B and PLFS implementation 925B.

In this embodiment, data portion is stored on data storage array 930. Data portion 904 is stored on flash storage buffer 920B and data storage array 930. As shown, Compute Node 905 uses I/O forwarding module 910 to retrieve data portion 902. I/O forwarding module 910 analyzes index 906 to determine a location of data portion 902. I/O forwarding module 910 determines that data portion 902 is stored on burst buffer node 915A and sends I/O request using message 940.

Figure 10:
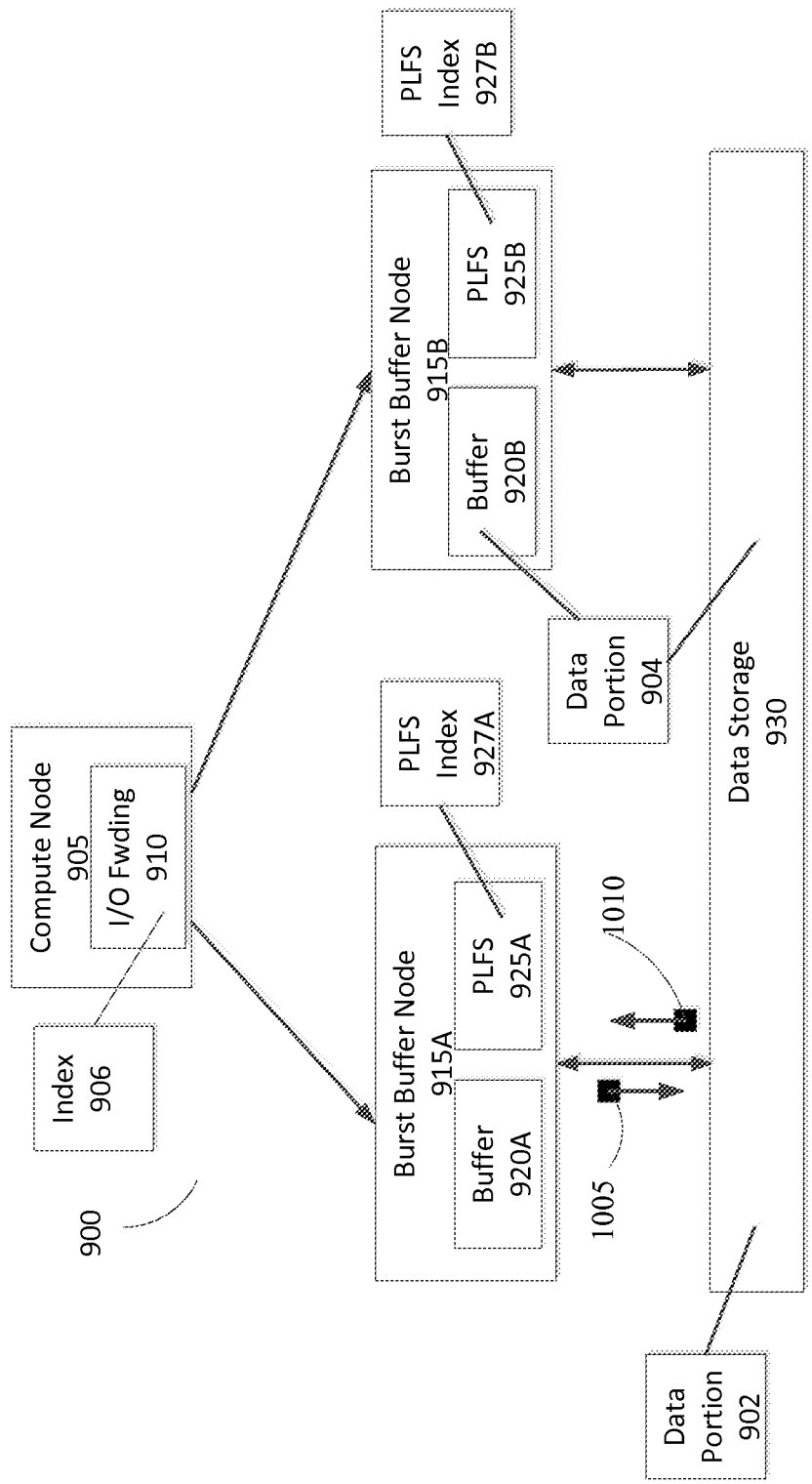
FIG. 10 is a simplified illustration of an implementation of PLFS combined with an I/O forwarder requesting data in a HPC Environment in a second state, in accordance with an embodiment of the present disclosure.

Refer to the example embodiment of FIG. 10. FIG. 10 is a simplified illustration of an implementation of PLFS combined with an I/O forwarder requesting data in a HPC Environment in a second state, in accordance with an embodiment of the present disclosure. In this embodiment, PLFS Implementation 925A has received an I/O request for data portion 902. PLFS Implementation 925A analyzes PLFS index 927A and determines that data portion 902 is stored on data storage array 930. PLFS Implementation 925A requests data portion 902 using message 1005. Data storage array receives request message 1005 and processes data request and responds with message 1010 including data portion 902.

Figure 11:
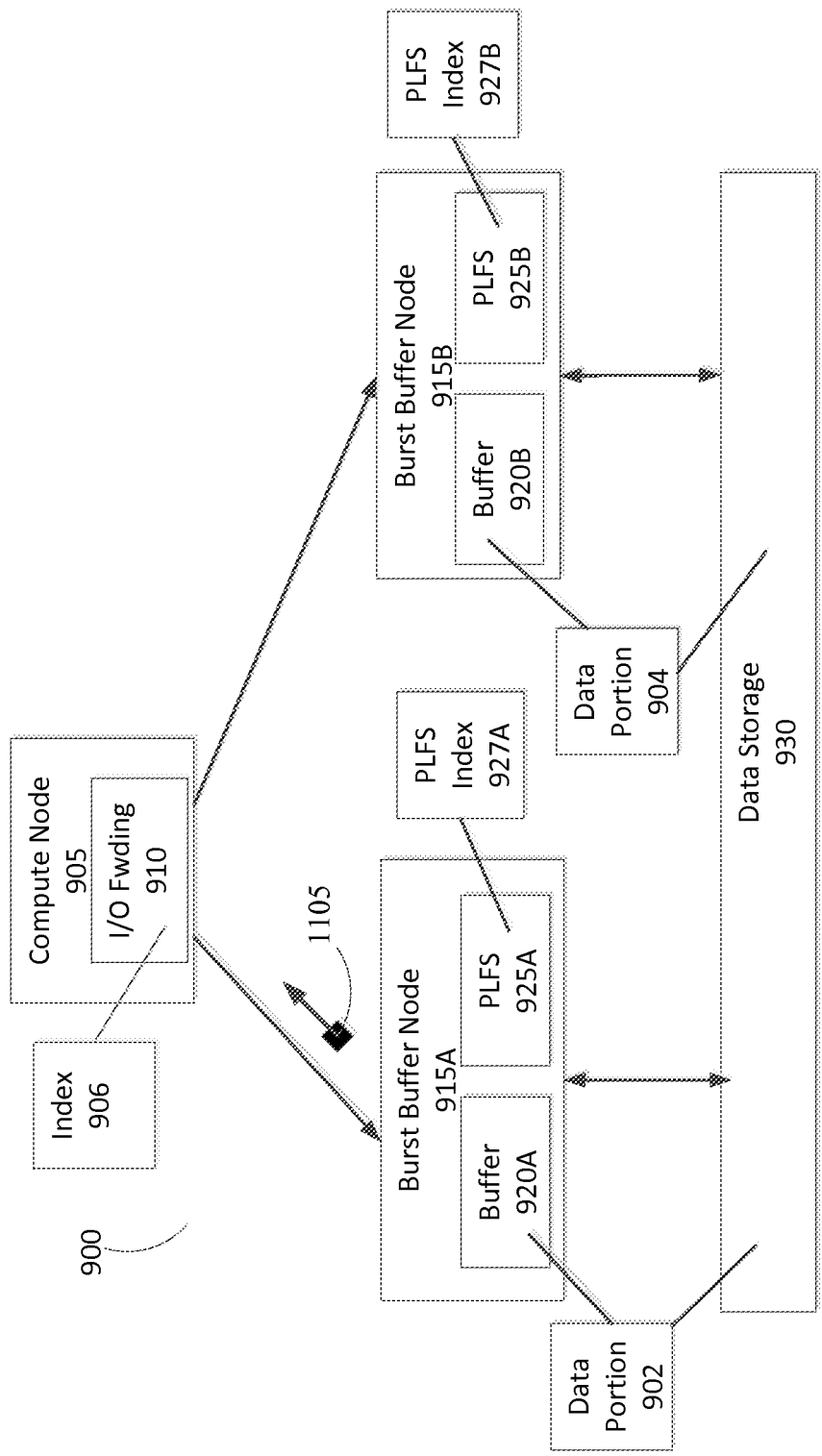
FIG. 11 is a simplified illustration of an implementation of PLFS combined with an I/O forwarder requesting data in a HPC Environment in a third state, in accordance with an embodiment of the present disclosure.

Refer to the example embodiment of FIG. 11. FIG. 11 is a simplified illustration of an implementation of PLFS combined with an I/O forwarder requesting data in a HPC Environment in a third state, in accordance with an embodiment of the present disclosure. In this embodiment, data portion 902 is stored in flash storage buffer 920A and data storage array 930. PLFS implementation 925A responds to the initial data request and sends data portion 902 to compute node using message 1105.

Figure 12:
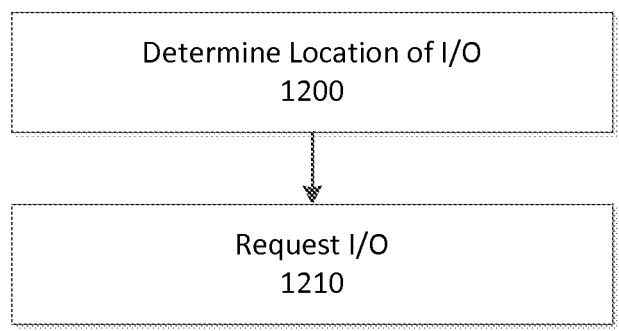
FIG. 12 is a simplified flowchart of a method of requesting data in an HPC Environment as shown in FIG. 9, in accordance with an embodiment of the present disclosure.

Refer to the example embodiment of FIGS. 9 and 12. FIG. 12 is a simplified flowchart of a method of requesting data in an HPC Environment as shown in FIG. 9, in accordance with an embodiment of the present disclosure. In this embodiment, Compute uses I/O forwarding module 910 to retrieve data portion 902. I/O forwarding module 910 determines location of requested I/O (Step 1200) by analyzing index 906. I/O forwarding module 910 determines that data portion 902 is located on burst buffer node 915A. I/O forwarding module 910 requests I/O from burst buffer node 915A (Step 1210).

Figure 13:
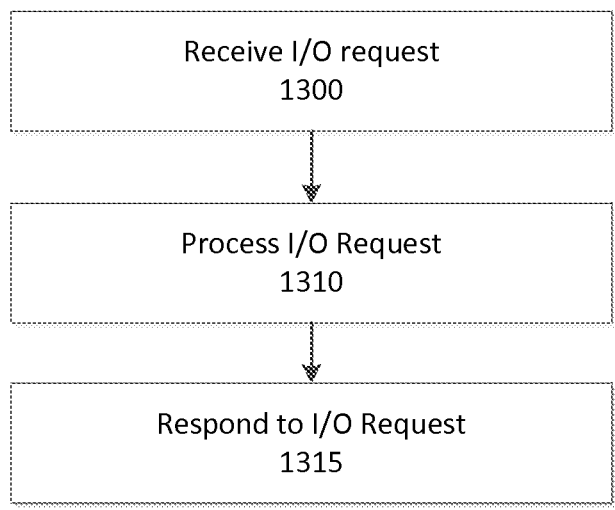
FIG. 13 is a simplified flowchart of a method of responding to an I/O request in an HPC Environment as shown in FIG. 11, in accordance with an embodiment of the present disclosure.

Refer to the example embodiment of FIGS. 10 and 13. FIG. 13 is a simplified flowchart of a method of responding to an I/O request in an HPC Environment as shown in FIG. 11, in accordance with an embodiment of the present disclosure. As shown, Burst Buffer node 915 received I/O request (Step 1300) from compute node 905. PLFS implementation 925A processes I/O request (Step 1310). PLFS implementation determines that requested I/O (Data portion 902) is stored on data storage 930. PLFS Implementation 925A requests data portion 902 from data storage array 930 using message 1005. Data storage array responds to request by sending data portion 902 to burst buffer node 915A using message 1010. Burst buffer node 915A stores data portion 902 in flash storage buffer 920A. PLFS implementation responds to I/O request and sends Data portion 902 to compute node 905 (Step 1315).

Figure 14:
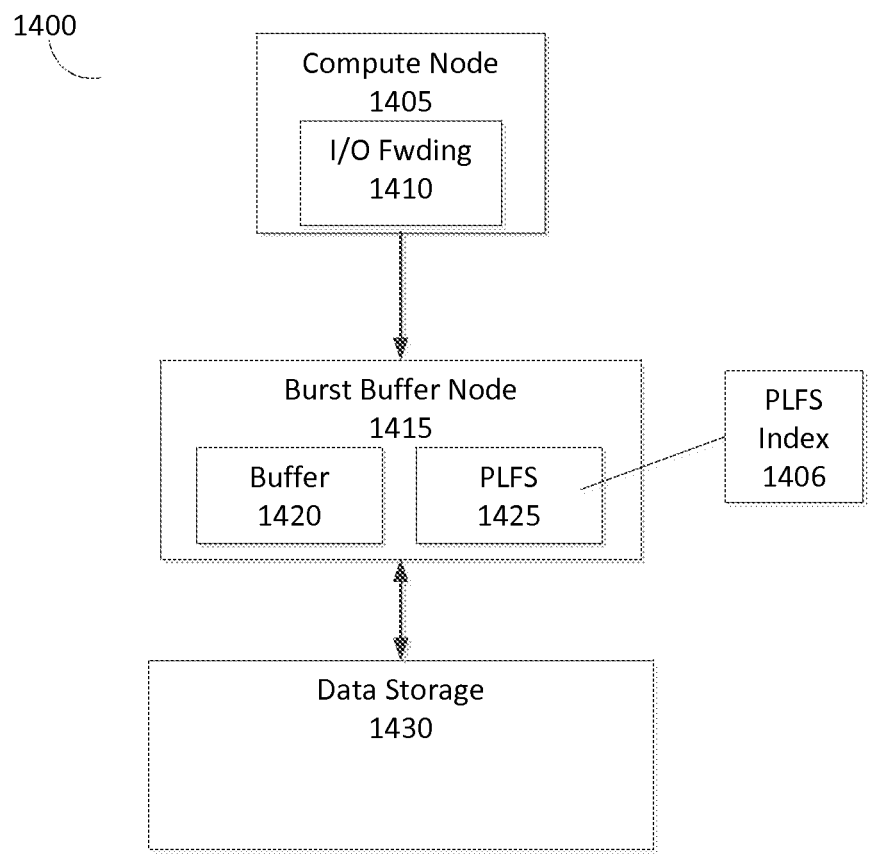
FIG. 14 is a simplified illustration of an alternate implementation of a HPC Environment includes an I/O forwarding module combined with a PLFS implementation, in accordance with an embodiment of the present disclosure.

Refer to the example embodiment of FIG. 14. FIG. 14 is a simplified illustration of an alternate implementation of a HPC Environment includes an I/O forwarding module combined with a PLFS implementation, in accordance with an embodiment of the present disclosure. As shown, HPC environment 1400 includes compute node 1405, burst buffer node 1415, and data storage array 1430. Compute node 1405 is in communication with burst buffer node 1415. Burst buffer node 1415 is in communication with data storage array 1430. Burst buffer node 1415 includes flash storage buffer 1420 and PLFS implementation 1425. In this embodiment, compute node 1405 uses I/O forwarding module 1410 send and receive I/Os to and from burst buffer node 1415. PLFS Implementation 1425 processes each received I/O. PLFS Implementation 1425 stores received I/Os and creates metadata associated with each received I/O. PLFS implementation 1425 stores created metadata in PLFS index 1406.

In this embodiment, compute node 1405 is only in communication with burst buffer node 1415. As shown, I/O forwarding module 1410 does not retain metadata and allows burst buffer node 1415 to store and/or manage I/Os sent form compute node 1405. PLFS Implementation 1425 takes each received I/O and stores the I/O on flash storage buffer 1420 and creates associated metadata in PLFS Index 1406. PLFS Implementation 1425 is enabled to replicate received I/Os on data storage array 1430.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 15:
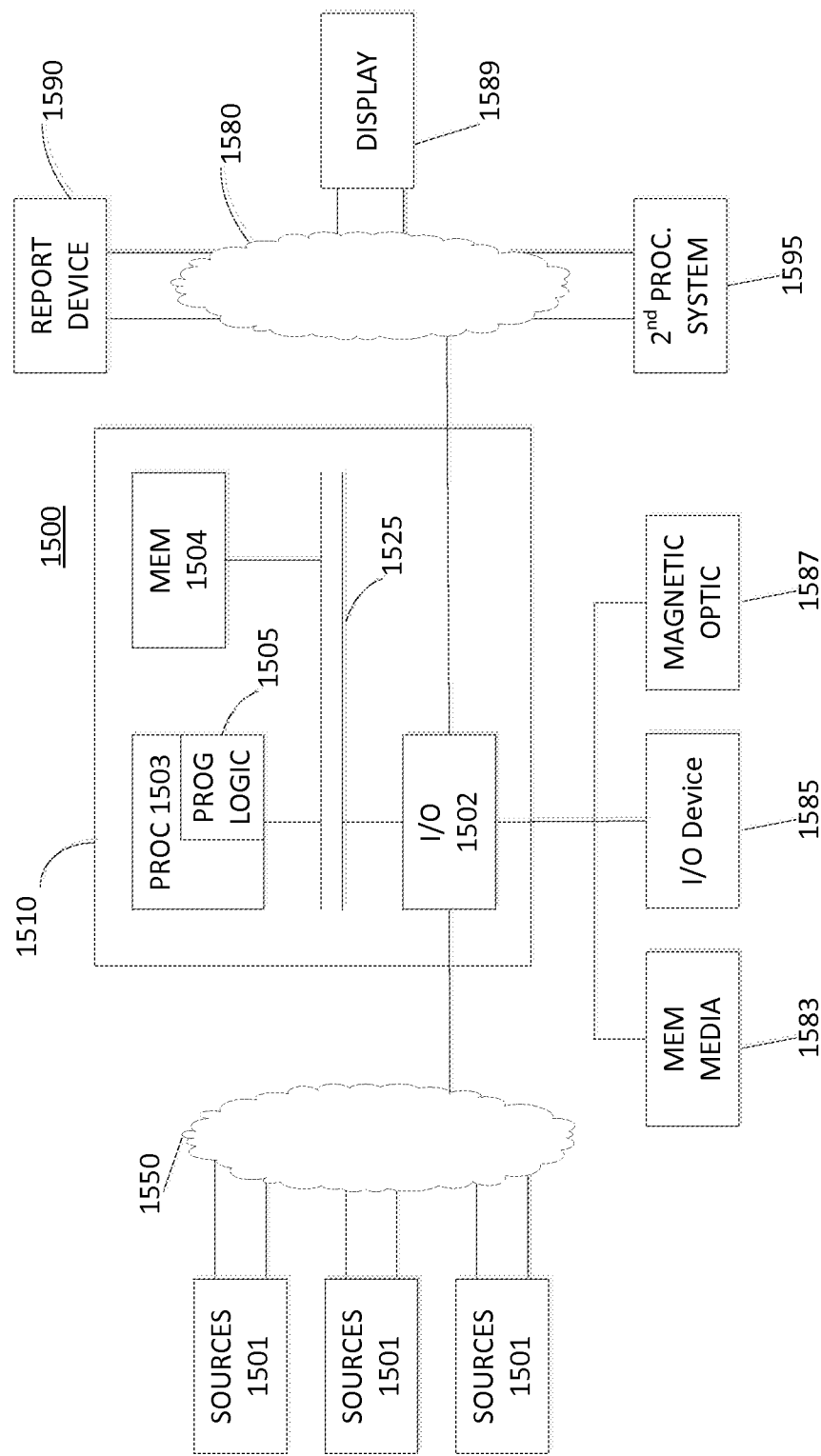
FIG. 15 is an example of an embodiment of an apparatus that may utilize the techniques described herein, in accordance with an embodiment of the present disclosure.

FIG. 15 is a block diagram illustrating an apparatus, such as a computer 1510 in a network 1500, which may utilize the techniques described herein according to an example embodiment of the present invention. The computer 1510 may include one or more I/O ports 1502, a processor 1503, and memory 1504, all of which may be connected by an interconnect 1525, such as a bus. Processor 1503 may include program logic 1505. The I/O port 1502 may provide connectivity to memory media 1583, I/O devices 1585, and drives 1587, such as magnetic or optical drives. When the program code is loaded into memory 704 and executed by the computer 1510, the machine becomes an apparatus for practicing the invention. When implemented on one or more general-purpose processors 1503, the program code combines with such a processor to provide a unique apparatus that operates analogously to specific logic circuits. As such, a general purpose digital machine can be transformed into a special purpose digital machine.

Figure 16:
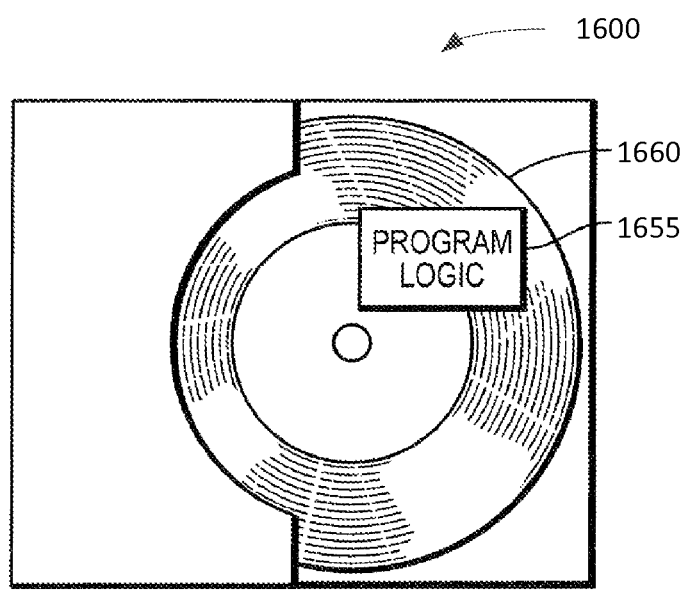
FIG. 16 is an example of a method embodied on a computer readable storage medium that may utilize the techniques described herein, in accordance with an embodiment of the present disclosure.

FIG. 16 is a block diagram illustrating a method embodied on a computer readable storage medium 1660 that may utilize the techniques described herein according to an example embodiment of the present invention. FIG. 16 shows Program Logic 1655 embodied on a computer-readable medium 1660 as shown, and wherein the Logic is encoded in computer-executable code configured for carrying out the methods of this invention and thereby forming a Computer Program Product 1600. Program Logic 1655 may be the same logic 1505 on memory 1504 loaded on processor 1503 in FIG. 15. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing I/O requests from a compute node in communication with a data storage system including one or more burst buffer nodes each including one or more of flash storage, wherein the data storage system includes a first burst buffer node and a second burst buffer node of the one or more burst buffer nodes, the computer-executable method comprising:
    striping data on the first burst buffer node and the second burst buffer node, wherein a first portion of the data is communicated to the first burst buffer node and a second portion of the data is communicated to the second burst buffer node;
    processing the first portion of the data at the first burst buffer node; and
    processing the second portion of the data at the second burst buffer node.

2. The computer-executable method of claim 1, wherein the processing of the first portion of the data comprises:
    writing the first portion of the data to data storage based on a Parallel Logged File System (PLFS).

3. The computer-executable method of claim 1, wherein the processing of the second portion of the data comprises:
    writing the second portion of the data to data storage based on a Parallel Logged File System (PLFS).

4. The computer-executable method of claim 1, further comprising requesting a data I/O from the data storage system.

5. The computer-executable method of claim 4, wherein the requesting comprises:
    determining a location of the data I/O on the data storage system; and
    requesting the data I/O based on the location of the data I/O.

6. A system, comprising:
    a compute node;
    a data storage system comprising one or more burst buffers each including one or more of flash storage, wherein the data storage system includes a first burst buffer node and a second burst buffer node of the one or more burst buffers, the data storage system in communication with the compute node; and
    computer-executable program logic encoded in memory of one or more computers in communication with the data storage system to enable management of I/O requests from the compute node, wherein the computer-executable program logic is configured for the execution of:
        striping data on the first burst buffer node and the second burst buffer node, wherein a first portion of the data is communicated to the first burst buffer node and a second portion of the data is communicated to the second burst buffer node;
        processing the first portion of the data at the first burst buffer node; and
        processing the second portion of the data at the second burst buffer node.

7. The system of claim 6, wherein the processing of the first portion of the data comprises:
    writing the first portion of the data to data storage based on a Parallel Logged File System (PLFS).

8. The system of claim 6, wherein the processing of the second portion of the data comprises:
    writing the second portion of the data to data storage based on a Parallel Logged File System (PLFS).

9. The system of claim 6, wherein the computer-executable program logic is further configured for the execution of requesting a data I/O from the data storage system.

10. The system of claim 9, wherein the requesting comprises:
    determining a location of the data I/O on the data storage system; and
    requesting the data I/O based on the location of the data I/O.

11. A computer program product for managing I/O requests from a compute node in communication with a data storage system including one or more burst buffers each including one or more of flash storage, wherein the data storage system includes a first burst buffer node and a second burst buffer node of the one or more burst buffers, the computer program product comprising:
    a non-transitory computer readable medium encoded with computer-executable program code for using read signatures in replication, the code configured to enable the execution of:
        striping data on the first burst buffer node and the second burst buffer node, wherein a first portion of the data is communicated to the first burst buffer node and a second portion of the data is communicated to the second burst buffer node;
        processing the first portion of the data at the first burst buffer node; and processing the second portion of the data at the second burst buffer node.

12. The computer program product of claim 11, wherein the processing of the first portion of the data comprises:
writing the first portion of the data to data storage based on a Parallel Logged File System (PLFS).

13. The computer program product of claim 11, wherein the processing of the second portion of the data comprises:
writing the second portion of the data to data storage based on a Parallel Logged File System (PLFS).

14. The computer program product of claim 11, the code is further configured to enable the execution of requesting a data I/O from the data storage system.

15. The computer program product of claim 14, wherein the requesting comprises:
determining a location of the data I/O on the data storage system;
requesting the data I/O based on the location of the data I/O.

* * * * *